O. C. MARTIN.
PROCESS AND APPARATUS FOR REFINING COPPER.
APPLICATION FILED APR. 5, 1918.
1,400,892.
Patented Dec. 20, 1921.
7 SHEETS—SHEET 6.
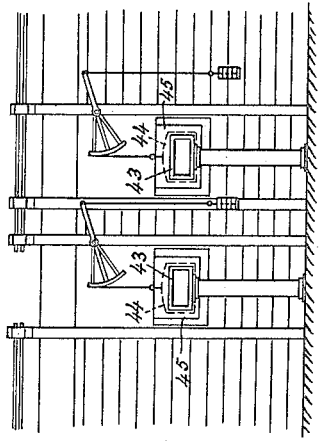
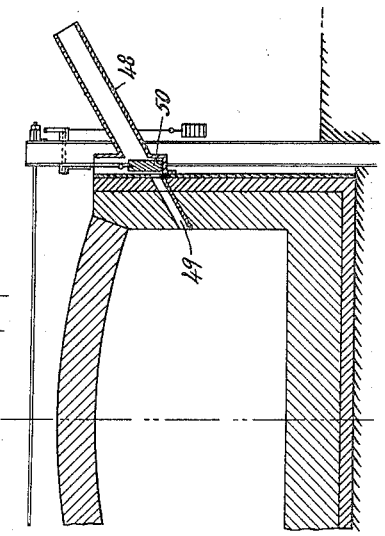
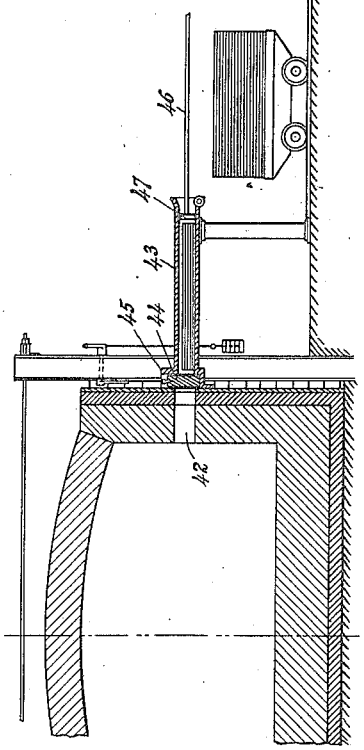
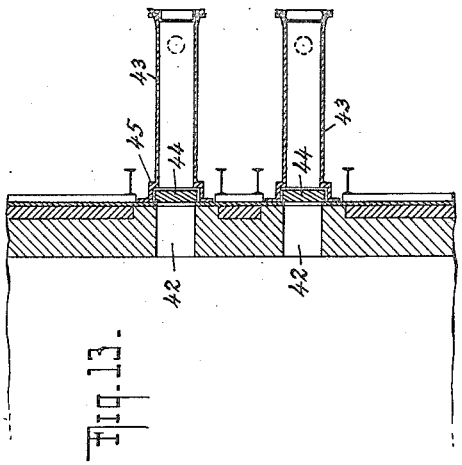
WITNESSES
INVENTOR
OLIVER C. MARTIN
BY
ATTORNEYS

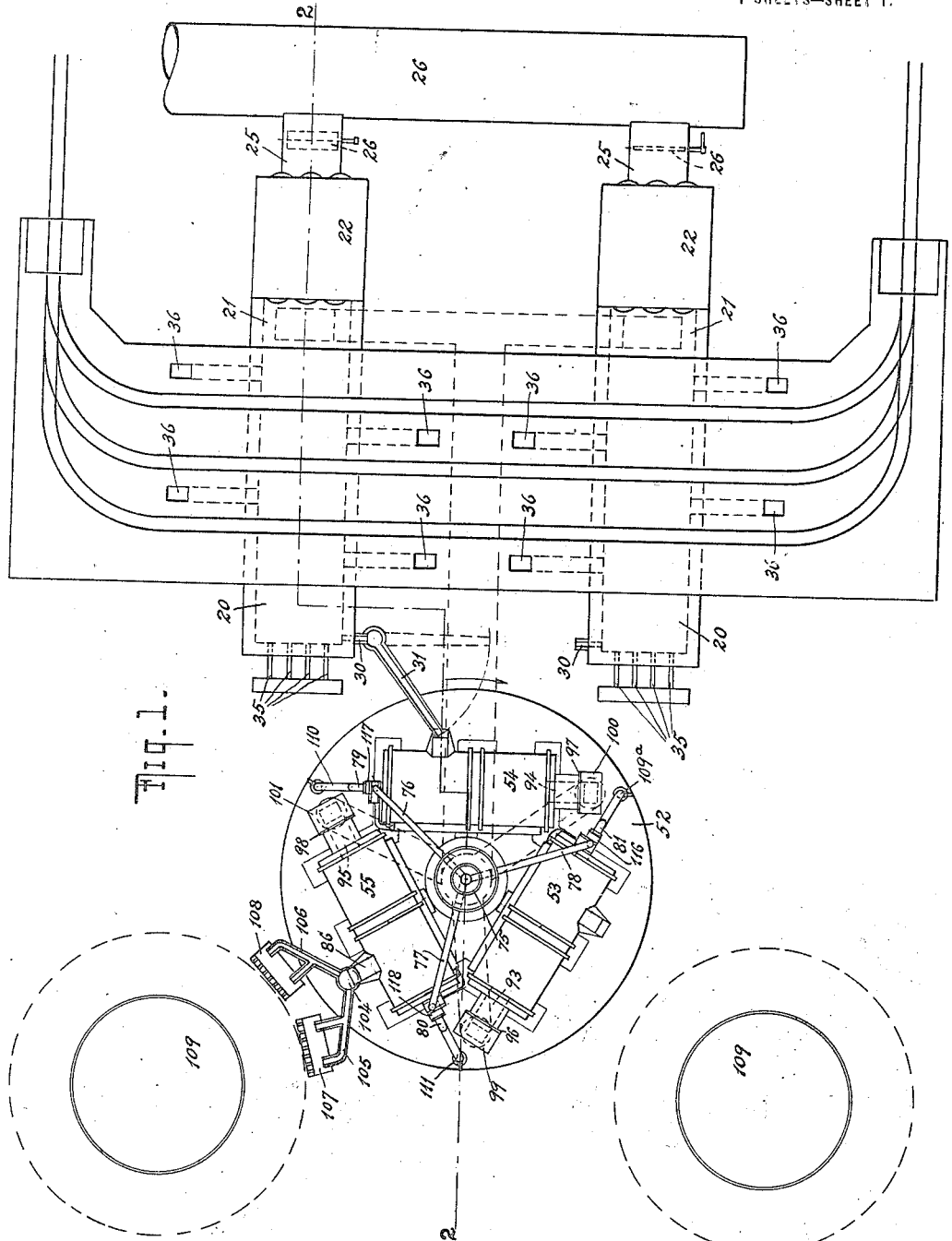

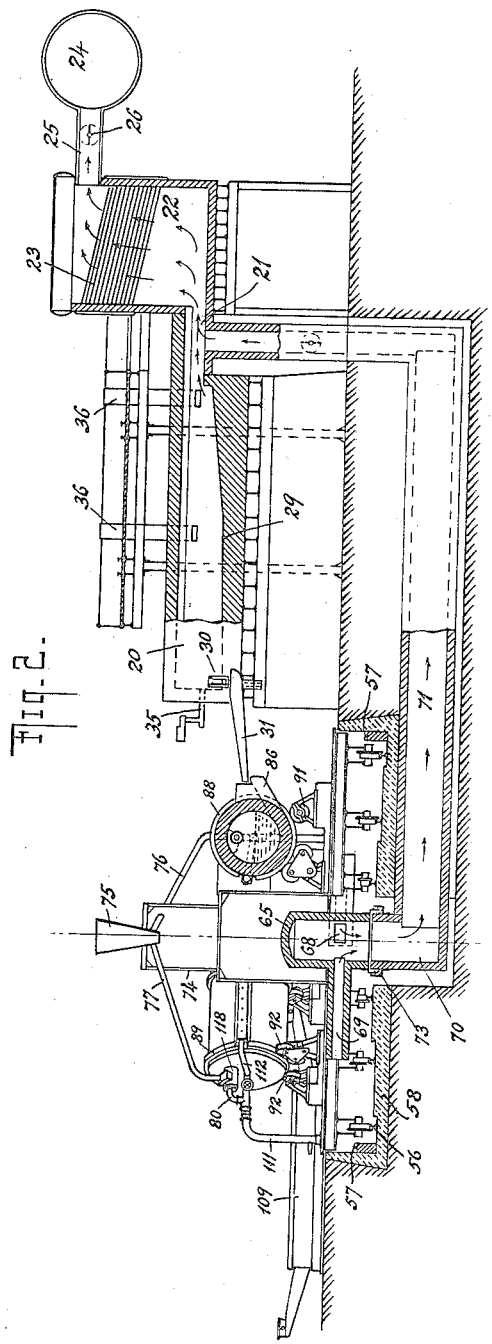

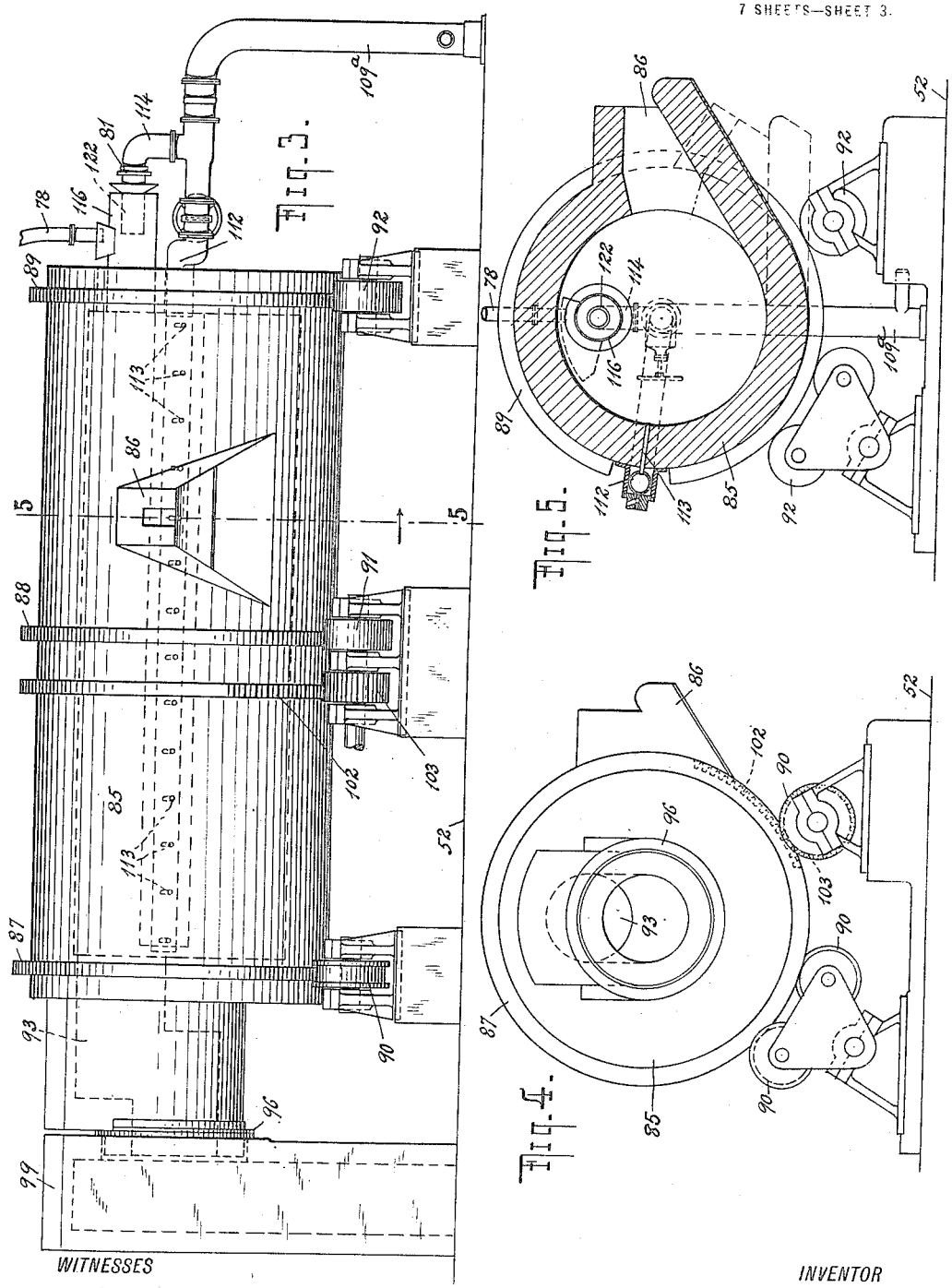

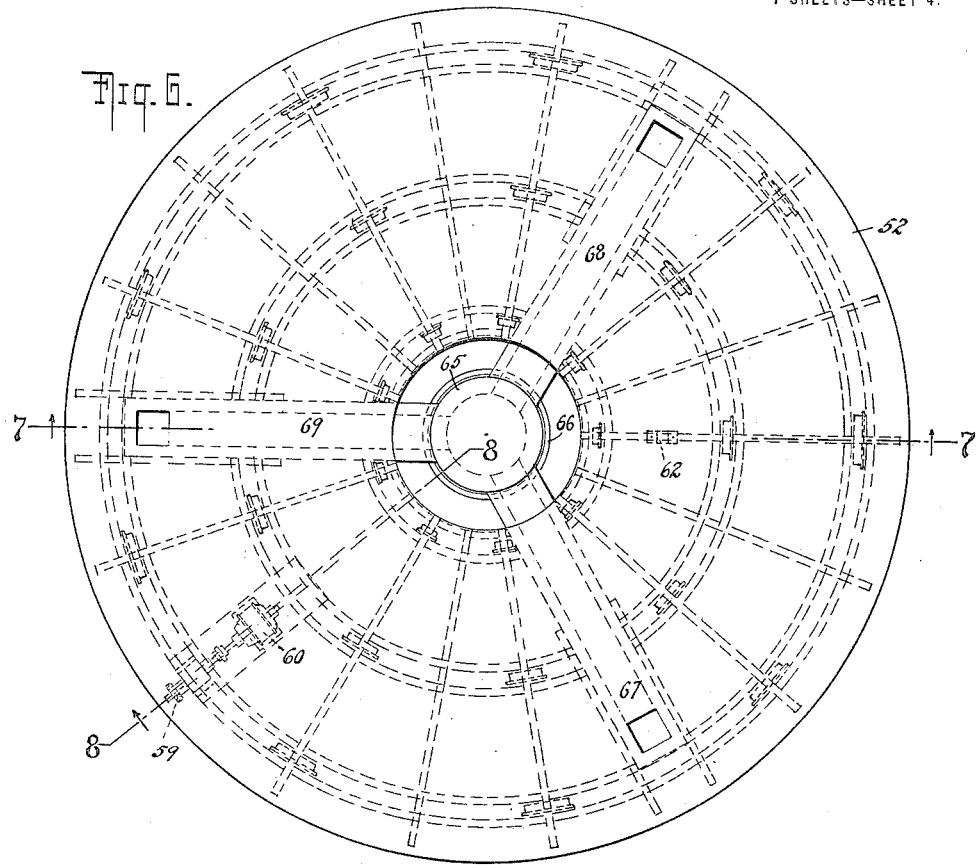
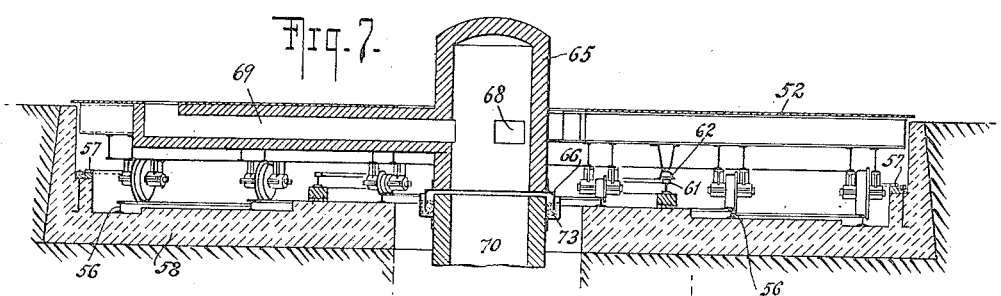
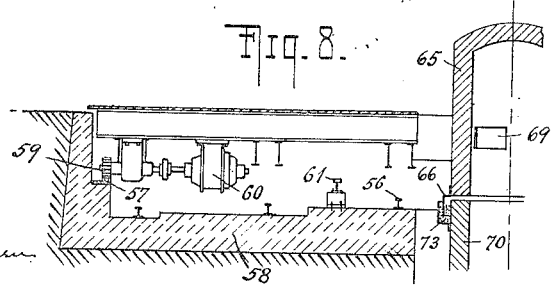

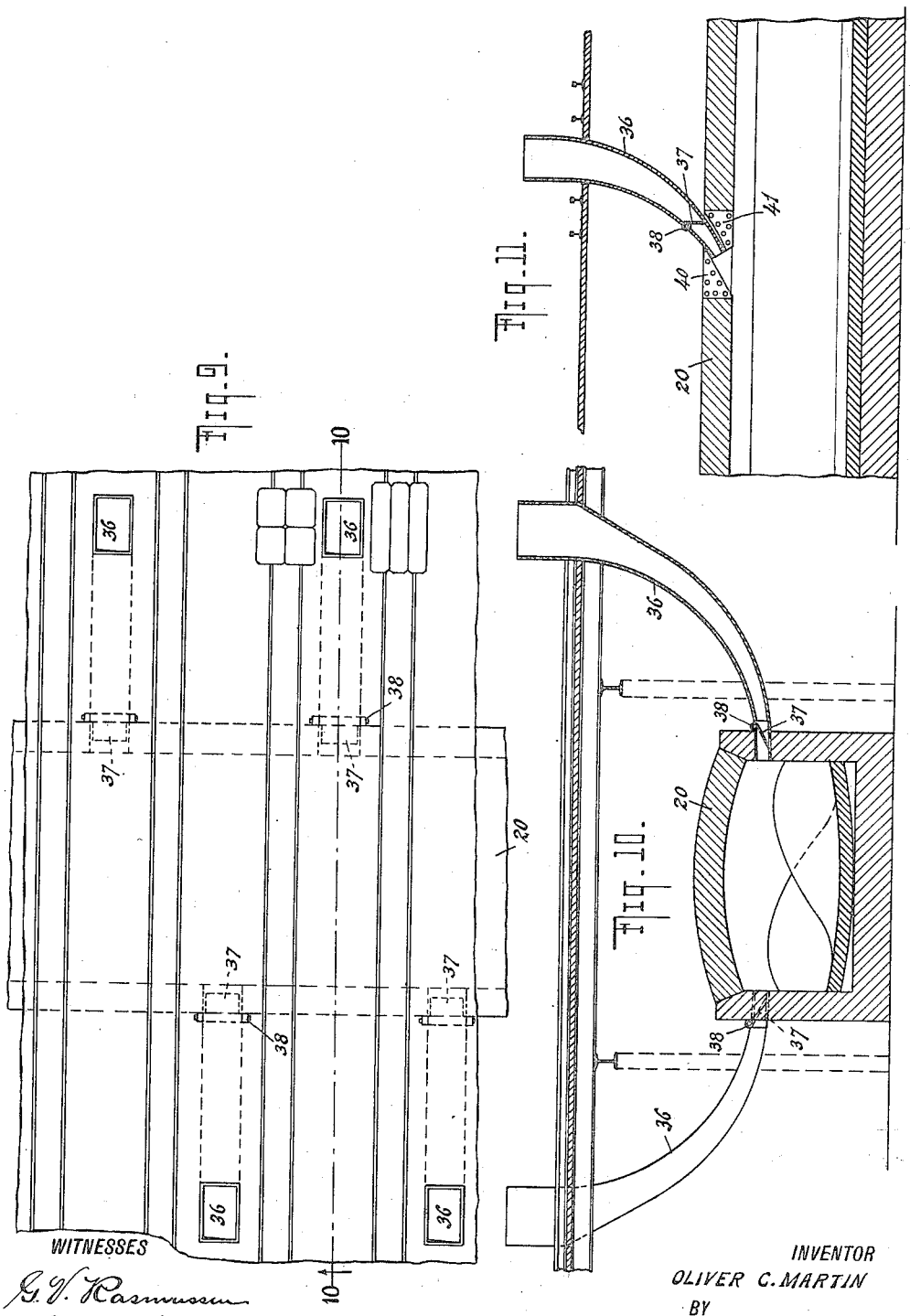

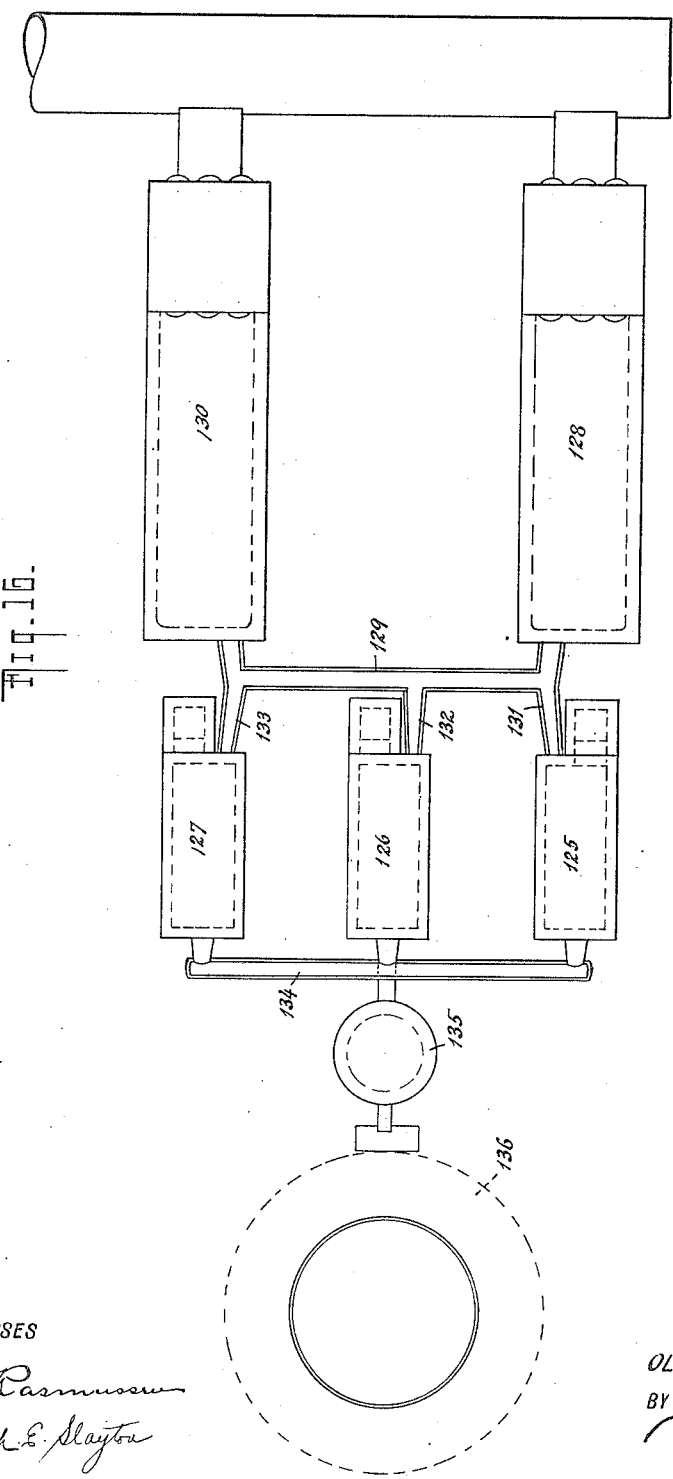

UNITED STATES PATENT OFFICE.

OLIVER C. MARTIN, OF RICHMOND HILL, NEW YORK, ASSIGNOR TO NICHOLS COPPER COMPANY, OF NEW YORK, N. Y., A CORPORATION OF NEW YORK.

PROCESS AND APPARATUS FOR REFINING COPPER.

1,400,892.   Specification of Letters Patent.   Patented Dec. 20, 1921.

Application filed April 5, 1918. Serial No. 226,851.

*To all whom it may concern:*

Be it known that I, OLIVER CURTIS MARTIN, a citizen of the United States, and a resident of Richmond Hill, county of Queens, State of New York, have invented certain new and useful Improvements in Processes of and Apparatus for Refining Copper, of which the following is a specification.

My invention relates to the refining of copper and particularly blister and cathode copper, although it may also be applied to scrap copper, and comprises the method of and apparatus for effecting the refining in an efficient and economical manner with the production of a high grade of copper. The usual practice in refining such copper is to melt the charge in either a cupola or reverberatory furnace. In case a reverberatory furnace is employed for the melting operation, the copper is both melted and poled in the same furnace and in case a cupola furnace is used the molten copper is in one form of proposed apparatus preliminarily poled in towers through which it passed on its way to the poling furnaces and the casting machine, or poled in separate receptacles. The inherent disadvantages of cupola melting are that the molten copper becomes locally superheated because the flame plays directly on but a small portion of the unrefined copper and the impurities are absorbed by the copper to a considerable extent while the tower poling with cupola melting requires, for efficient operation, the employment of artificial means (i. e., additional heating units) to keep the tower warm and to maintain the copper molten, because of the considerable distance which the molten metal must traverse from the melting furnace to the poling furnace proper.

My invention largely obviates the difficulties above described and comprises other advantages which will appear more fully hereafter.

My method comprises charging the copper into the melting furnace so that the walls and bottom are largely protected by the copper charge and a larger surface thereof is exposed to the action of the melting flame. Usually in charging melting furnaces of the reverberatory type, the copper is fed into the furnace either through openings in the roof or charged through side doors. The openings in the roof not only reduce the strength of the arch and thus decrease the strength and the life of the furnace, but the formation of heaps of raw copper on the median line of the furnace causes the flame to pass on either side of such heaps and in close proximity to the unprotected side walls. These uncovered walls are thus exposed to the direct heat of the flame which causes the furnace to deteriorate very rapidly. The charging through side doors above referred to is detrimental to the furnace as but small quantities of copper can be introduced at a time, hence the side doors must be kept open for a considerable length of time until a sufficient charge has been introduced for the melting operation. The opening of the side doors permits the escape of the hot gases in the furnace and the entrance of cooled air which retards the melting of the copper charge and causes a cooling of the inner surface of the furnace and spalling of the brick. Hence such charging is detrimental and uneconomical because of its effect on the furnace and as more heat is required to accomplish the melting. Instead of introducing the charge by either of the methods above referred to, I preferably employ curved chutes passing through the side walls of the furnace and preferably alternately arranged so as to produce on each side of the furnace alternate semi-conical heaps. The copper to be melted passes down these chutes and into the furnace by gravity. This arrangement of heaps of unrefined copper tends to keep the melting flame in the center and near the top of the furnace thus protecting the bottom and side walls from its direct heat, while at the same time exposing a greater surface of the copper charge to the heat of the flame and thus permitting a more rapid melting of the charge. In addition to the said chute I may also employ chutes in the roof, in which case I would form a plurality of central conical heaps which, with the semi-conical heaps above referred to, would protect the bottom and side walls and hence compensate to a large extent for the reduction in the strength of the arch.

My invention also contemplates means for preventing air from entering the melting furnaces during the charging operation, so that the melting of the copper may be accomplished with less expenditure of heat.

My furnace is further characterized by an inclined bottom so that the molten copper as it is formed flows toward one end of the furnace from which it can be readily moved as fast as formed. In order to obviate a large number of heating elements to keep the molten copper on its way from the furnace to the casting machine in a molten condition, I provide, for instance, a turntable carrying holding furnaces between the furnace and casting machine so that as soon as the molten copper is withdrawn from the melting furnace it is immediately conveyed to the casting machine and poled while on its way. The arrangement of the holding furnaces on the turntable maintains the relation between the pouring, poling and casting of the copper, that is, while one holding furnace is receiving the charge from the melting furnace, the second holding furnace is being poled while the third holding furnace is emptying its charge into the holding ladles of the casting machine.

Instead of the turntable I may use three poling furnaces arranged in parallel similar in construction to my melting furnace and provided with inclined bottoms. These poling furnaces may be connected to a melting furnace by branch launders, the molten copper flowing into the launders and then into any one of the poling furnaces as desired.

My invention further comprises means for utilizing substantially all the heat developed in both the melting and poling of the copper which effects a considerable saving in the fuel required by the central power house. Copper refiners customarily utilize the heat of the melting furnace in their central power house. A special problem is, however, presented in utilizing the heat of the holding furnaces mounted on a turntable which, as above described, have a particular advantage *per se.*

The drawings accompanying this application disclose one example of my apparatus for the refining of copper; Figure 1 showing a top plan view partly diagrammatic; Fig. 2, a section of Fig. 1 on the line 2—2; Fig. 3, a side elevation of my holding furnace; Fig. 4, an end view of the holding furnace shown in Fig. 3 with some of the elements removed; Fig. 5 a section of Fig. 3 on the line 5—5; Fig. 6, a top plan view of the turntable; Fig. 7, a section of Fig. 6 on the line 7—7; Fig. 8, a detailed fragmentary section of Fig. 7 on the line 8—8 of Fig. 6; Fig. 9, a fragmentary top plan view of the melting furnace; Fig. 10, a section of Fig. 9 on the line 10—10; Fig. 11, a detailed section of a modified chute arrangement; Fig. 12, a partial vertical section of the melting furnace showing another modification of my feeding arrangement; Fig. 13, a horizontal section of Fig. 12; Fig. 14, an end elevation of Fig. 13; Fig. 15, a fragmentary vertical section of the melting furnace showing a modification of the feeding arrangement; and Fig. 16, a diagrammatic view of a modification of my poling means.

A reverberatory melting furnace 20 has at its front end an outlet 21 for the escape of the waste gases communicating with a boiler chamber 22 in which is located a boiler 23 for utilizing the heat of the waste gases coming from the melting furnace 20 and the holding furnaces to be described. The boiler chamber 22 communicates with a flue 24 through an outlet flue 25 provided for the escape of the gases to the stack whose heat energy has been largely utilized to heat the boiler 23. A suitable damper 26 is preferably provided in the outlet flue 25 so as to close off the communication of the furnace and flue when the furnace is not in use. The melting furnace 20 is further provided with an inclined bottom 29 having an outlet opening or spout 30 at its rear end for drawing off the molten metals and a pivotally mounted launder 31 having one orifice located beneath the spout 30 and the other orifice adapted to be put in communication with one of the holding furnaces. The launder 31 is adapted to convey the molten copper from the melting furnace to one of the holding furnaces, as will be hereinafter more fully explained. A fuel burner 35, preferably a liquid fuel burner as well known in the art (or a battery of such burners) is provided at the front end of the melting furnace 20 so that its flame may be projected through the furnace. A plurality of gravity charging chutes 36 are provided for the furnace and arranged on either side thereof in staggered form so as to form alternate, substantially semi-conical heaps of copper in the furnace 20, as shown in Fig. 10. Each of these charging chutes 36 is preferably provided with means for preventing the entrance of unnecessary air when the furnace is being charged. Figs. 9 to 15 disclose several modifications of the arrangement which I have provided for preventing such entrance of air to the melting furnace. In Figs. 9 and 10, the furnace 20 is provided with a plurality of curved chutes 36 alternately arranged on each side of the furnace in staggered fashion, having their outlet ends in the side walls of the furnace 20 and their inlet ends above the furnace. Each chute 36 is provided with a damper 37, hinged at 38, and adapted to be opened by the weight of the copper and closed by gravity.

When the unrefined copper, for instance blister or cathode copper, is fed into one of the chutes 36, it forces open the damper 37 and passes into the furnace. The damper after the passage of each portion of copper again closes and prevents the escape of the hot gases or the entrance of cold air which would materially increase the cost of the melting and exercise a deteriorating influence on the furnace. Fig. 11 shows an arrangement somewhat similar to that shown in Figs. 9 and 10, the walls being provided with metallic protecting elements 40 and 41 for protecting the brick work of the furnace wall. This arrangement is peculiarly suited for the roof chutes in case such are employed as the end of the chute preferably enters at an angle to the wall so as not to cause too great an impact on the bottom of the furnace. In Figs. 12 to 14 which show another modification of my charging means, the melting furnace 20 has an opening 42 with which a partially split member 43 of rectangular construction registers. The split portions may be held together by any convenient means as, for example, dowel pins, so that the top portion may be lifted off when the member 43 is to be filled with the charge. Interposed between the member 43 and the opening 42 is a vertically operating door 44 which may be counterbalanced in any convenient manner, for example, by weight, as shown in the drawings and supported in a suitable guideway 45. A plunger 46 having an operating head 47 fitting the member 43 is operated by a suitable charging machine (not shown) and is adapted to reciprocate in said cylindrical member 43. The cylinder may be filled with copper, e. g., blister copper, by lifting up one of the split portions, the door 44 opened, and the plunger 46 set in operation, thus forcing the copper into the melting furnace, the operating head 47 of the plunger 46 following the charge and preventing to a large extent the entrance of cold air to the furnace or the hot gases escaping. Fig. 15 discloses an inclined feed chute 48 communicating with a chute 49 in the wall of the furnace and of smaller diameter than the chute 48. The unrefined copper is gravity fed to the furnace through these chutes 48 and 49, the air being prevented from entering thereto by a door 50 which may be counterbalanced in a similar manner as that described for the door 44 shown in Figs. 12 and 14.

Preferably, I employ two melting furnaces as 20 arranged side by side so that in case one of said furnaces is temporarily out of commission I need not discontinue my refining operation. A turntable 52 carrying a plurality of holding furnaces (preferably three, although any number may, of course, be used) 53, 54, 55, is provided substantially between the two melting furnaces so that either may be readily connected with one of the holding furnaces mounted thereon by swinging the pivoted launder 31 in the required direction. The turntable 52 is rotatably supported, e. g., on a plurality of tracks 56. A circular rack 57 is preferably secured to a concrete foundation 58 in which the turntable is adapted to rotate. A pinion 59, actuated by a motor 60 through suitable shafting, is rotatably secured to the lower side of the turntable by convenient bearings and is adapted to engage the rack 57 and thus rotate the turntable, suitable reducing gearing (not shown) is preferably provided, in case a motor is used to furnish the motive power, to reduce the speed of the pinion. The necessary energy for the motor is secured from any suitable source, e. g., an electrified contact rail 61 with which a contact shoe 62 is normally in contact. The shoe 62 is connected with the motor by a suitable wiring (not shown) and suitable circuit breaking means provided and located at any suitable point at which it is readily accessible to the operator. The turntable 52 has located in its axial center, a housing 65 which is provided at its lower end with a peripheral flange 66 and adapted to rotate with the turntable 52.

A plurality of exhaust flues 67, 68 and 69, extend radially from the housing 65 and communicate therewith. Each of these flues communicates with one of the holding furnaces mounted on the turntable and is adapted to convey the exhaust gases from such holding furnaces to the housing 65. Axially located with respect to the housing 65 is a collecting exhaust flue 70 communicating with a branch flue 71 preferably communicating, for example, with the outlet flue 21. The hot gases coming from the furnace 20 and the holding furnaces produce a draft which accelerates the withdrawal of the waste gases. The exhaust flue 70 is preferably provided at its upper periphery with a sand trough 73 in which the flange 66, secured to the housing 65, is adapted to rotate. The sand trough 73 and flange 66 form an efficient and economical seal between the rotating housing 65 and the exhaust flue 70. A scaffolding 74 supporting a coal container 75 is preferably provided in the center of the turntable from the lower end of which extend a plurality of pipes 76, 77, and 78, adapted to convey the fuel to the nozzles 79, 80 and 81, to be described. On the turntable 52 are mounted a plurality of tiltable holding furnaces 53, 54 and 55, preferably three in number and located 120° apart. Each holding furnace comprises an elongated cylinder 85 having a dumping spout 86 and provided with a plurality of peripheral bearing rims 87, 88 and 89, which are adapted to rest on rollers 90, 91 and 92, respectively, one of which is preferably flanged and the others flat so as to allow for expansion. These rollers are supported on suitable brackets moored to the turntable and permit the holding furnaces to be readily tilted by the mechanism to be described. Furnace flues 93, 94 and 95, are secured to one end of each of the holding furnaces 53, 54 and 55, respectively, and are each provided with male bearing flanges 96, 97 and 98, respectively. For each of these flues there is provided the vertical flue casings 99, 100 and 101, secured to the turntable and provided with openings adapted to receive the flanges 96, 97 and 98. This arrangement permits axial movement of the holding furnaces relatively to the casings when the contents of the furnaces are to be poured. The holding furnaces are each provided with a segment of a peripheral rack 102. A pinion 103 actuated by any suitable motive power as, for example, an electric motor preferably provided with suitable reducing gear (not shown) and carried in suitable bearings, engages the rack 102. The motor by rotating the pinion 103 rotates the requisite holding furnace on its axis and lowers the dumping spout 86 thereof so that the molten contents are spilled into launder 104 having branch launders 105 and 106, which latter communicates with holding ladles 107 and 108, from which the molten copper may be poured into compartments of the casting machine 109, as is well understood.

Reducing flame nozzles 122, i. e., projecting flames containing a large proportion of uncombined carbon, for instance, powdered charcoal, are provided for each of the holding furnaces 53, 54 and 55. These nozzles, one of which is shown in Fig. 3, are preferably placed on the end opposite to the exhaust end of the holding furnace 55 and adapted to reduce or pole the molten copper. Vertical air pipes 109ª, 110 and 111, are respectively provided on the turntable for each holding furnace. These pipes may be provided with a suitable coupling connected by a hose to a suitable air source (not shown) to allow for the rotation of the turntable. Each of these pipes has a branch arm 112 preferably lying on the surface of the respective cylinder 85 and parallel with the axis of the respective holding furnace. The branch arm 112 is provided with a plurality of openings of small diameter 113, so that a blast of evenely distributed air may be forced into the molten copper which oxidizes the copper prior to poling. A branch pipe as 114 communicates with each of the pipes 109ª, 110 and 111, and terminates in the nozzles 122. Sleeves 116, 117 and 118, extend from the wall of each holding furnace and are concentric with each of the nozzles 122. The vertical coal pipes 76, 77 and 78 communicating with the coal container 75 are adapted to continuously spill powdered charcoal or other carbonaceous material in front of the nozzles, the blast of air blowing the coal into the holding furnaces. The heat of the molten copper ignites the coal, the combustion of which not only maintains the molten condition of the copper but on account of the excess of carbon present reduces any oxid formed in the oxidizing or melting operation. Refined copper of high grade is obtained ready for casting.

Instead of employing the turntable, I may employ three furnaces 125, 126 and 127 (shown in Fig. 16) connected by launders 129 with melting furnaces 128 and 130. The melting furnaces 128 and 130 are similar in construction to the melting furnace 20 and are each provided with chutes for feeding the copper to be melted thereto. The furnaces 125, 126 and 127 are similar to furnace 20 but do not have chutes, the molten copper being fed into one end through branch launders 131, 132, 133, and out the other through collecting launder 134, being poled while on its way by a suitable reducing flame similar to that coming from nozzle 122. The launder, 134, communicates with a collecting chamber 135, from which the molten copper is poured into the usual casting machine, 136.

When I speak of semi-conical heaps I do not mean that in all cases the copper will form accurate cones but rather that the copper forms a mound the vertical surface of which covers the side wall and base covers the bottom.

The present application is, in part, a continuation of another application filed by me in the United States Patent Office on July 25, 1917, Serial No. 182,618.

I claim:

1. The process of refining copper which comprises melting the copper, transferring the molten copper directly to one of a plurality of holding furnaces, shifting the holding furnace from the melting furnace toward a casting machine and poling the molten copper during the shifting of said holding furnace, emptying said holding furnace and simultaneously filling another holding furnace, while said first named holding furnace is being emptied, substantially as and for the purpose described.

2. The process of refining copper which comprises melting the copper, collecting the molten copper at one end of the melting furnace, discharging the molten copper directly into a holding furnace, shifting said holding furnace toward a casting machine, and poling the molten copper in said holding furnace during the shifting thereof, emptying the molten charge into holding ladles and returning the empty holding furnace simultaneously with the poling of the copper in another holding furnace, substantially as and for the purpose described.

3. The process of refining copper which comprises melting the copper, transferring the molten copper directly to one of a plurality of holding furnaces, shifting said furnaces in a predetermined rotary path whereby the molten copper is carried away from the melting furnace and another empty holding furnace is concurrently moved to a position to receive molten copper from said melting furnace and poling the molten copper in said first named holding furnace during its passage over said rotary path.

4. The process of refining copper which comprises melting the copper, collecting the waste gases from such melting operation, poling the copper, collecting the waste gases from the poling operation and conducting all of said gases to a boiler chamber where the heat thereof is utilized, substantially as and for the purpose described.

5. The process of refining copper which comprises introducing copper to a melting furnace so as to form alternate semi-conical heaps on each side of the furnace and central conical heaps, the heaps protecting the bottom and side walls of the furnace and forcing the flame to remain near the middle of the furnace, substantially as and for the purpose described.

6. In an apparatus for refining copper the combination of a melting furnace, means for collecting the refined copper and means for directly receiving the molten copper from the melting furnace to transfer the molten metal from the melting furnace to the collecting means and simultaneously refine the copper, substantially as and for the purpose described.

7. In an apparatus for refining copper the combination of a melting furnace, means for collecting the refined metal, a turntable carrying a plurality of holding furnaces between said melting furnace and said holding means, to transfer the molten metal from the melting furnace to the collecting means, substantially as and for the purpose described.

8. In an apparatus for refining copper the combination of a melting furnace, holding ladles for collecting the refined metal, a turntable carrying a plurality of holding furnaces between said melting furnace and said holding ladles to transfer the molten metal from the melting furnace to the holding ladles, substantially as and for the purpose described.

9. In an apparatus for refining copper the combination of a reverberatory melting furnace, a turntable carrying a plurality of holding furnaces the holding furnaces being adapted to directly receive the molten metal from said melting furnace, substantially as and for the purpose described.

10. In an apparatus for refining copper the combination of a melting furnace, a casting machine, a turntable carrying a plurality of holding furnaces located between said casting machine and melting furnace and means for maintaining the molten condition of the metal in the holding furnace and for poling the metal, substantially as and for the purpose described.

11. A melting furnace for refining copper comprising a reverberatory furnace, a plurality of means for feeding copper to the furnace having their outlet ends passing through one of the side walls of the furnace, a plurality of means for feeding unrefined copper to the furnace, having their outlet ends passing through the opposite side walls of the furnace, some of the latter means being disposed intermediately between the charging means of the opposite wall, substantially as and for the purpose described.

12. A melting furnace for refining copper comprising a reverberatory chamber, a plurality of chutes for feeding unrefined copper to the furnace having their outlet ends passing through one of the side walls of the furnace, a plurality of curved chutes for feeding unrefined copper to the furnace, having their outlet ends passing through the opposite side walls of the furnace, some of the latter chutes being disposed intermediately between the charging means of the opposite wall to form alternate semi-conical heaps in the furnace, substantially as and for the purpose described.

13. In an apparatus for refining copper, the combination of a melting furnace, a plurality of curved chutes having their outlet ends projecting through one of the side walls of the furnaces, a plurality of curved chutes having their outlet ends passing through the opposite side of said furnaces, some of the latter chutes being alternately disposed relatively to the opposite chutes, a boiler chamber in communication with said melting furnace, a boiler in said boiler chamber to utilize the heat of the waste gases coming from said melting furnace, a casting machine, a turntable having a plurality of holding furnaces rotatably mounted thereon and located between said furnace and casting machine, a housing axially located on said turntable, a plurality of exhaust flues communicating with each of said holding furnaces and said housing, a collecting flue communicating with said housing and terminating in the said boiler chamber whereby the heat of the holding furnaces is utilized, means to rotate said turntable, means to pole the molten metal in said holding furnace and a pivotally mounted means secured to said furnace and adapted to convey the molten metal from said furnace to one of said holding furnaces, substantially as and for the purpose described.

14. In an apparatus for refining copper, the combination of a melting furnace, a plurality of feeding means projecting through one of the side walls of the furnaces, a plurality of feeding means having their outlet ends passing through the opposite side of said furnaces, the latter means being alternately disposed relatively to the opposite means, a boiler chamber in communication with said melting furnace, a boiler in said boiler-chamber to utilize the heat of the waste gases coming from said melting furnace, a casting machine, a turntable having a plurality of holding furnaces rotatably mounted thereon, a housing axially located on said turntable, a plurality of exhaust flues communicating with each of said holding furnaces, a collecting flue communicating with said housing and terminating in the said boiler chamber, means to rotate said turntable, means to pole said molten metal in said holding furnace, a pivotally mounted launder secured to said furnace and adapted to convey the molten metal from said furnace to one of said holding furnaces, substantially as and for the purpose described.

15. In an apparatus for refining copper the combination of a melting furnace, means for collecting the molten copper, rotatable means for transferring the molten copper from the melting furnace to the collecting means and means for collecting the waste gases from said transferring means, substantially as and for the purpose described.

16. In an apparatus for refining copper, the combination of a melting furnace, holding ladles, a turntable between the melting furnace and the holding ladles carrying a plurality of holding furnaces, means for poling the molten material in the holding furnaces and means for collecting the waste gases from said poling operation, substantially as and for the purpose described.

In testimony whereof I have hereunto set my hand.

OLIVER C. MARTIN.